Feb. 7, 1950

I. B. CURRENT 2,496,272

APPARATUS FOR THE DUPLICATING OF INDEX CARDS AND THE LIKE FOR CROSS FILING PURPOSES

Filed Dec. 27, 1945

2 Sheets-Sheet 1

Inventor
Ira B. Current

By M. O. Hayes

Attorney

Inventor
Ira B. Current
By M. O. Hayes
Attorney

Patented Feb. 7, 1950

2,496,272

UNITED STATES PATENT OFFICE 2,496,272

APPARATUS FOR THE DUPLICATING OF INDEX CARDS AND THE LIKE FOR CROSS FILING PURPOSES

Ira B. Current, United States Navy

Application December 27, 1945, Serial No. 637,477

2 Claims. (Cl. 88—24)

(Granted under the act of March 3, 1883, as amended April 30, 1928; 370 O. G. 757)

My invention relates to apparatus for the duplication of index-cards or the like for cross-filing purposes.

More particularly it relates to a photographic apparatus whereby a series of cross-reference cards, for example, containing all the original data but with a different subheading placed at the top of each successive copy is photographically reproduced from an individual typed, printed or otherwise prepared master filing card.

In the filing of information and keeping of valuable records, many business organizations, libraries, and institutions have found it necessary to maintain extensive cross-filing systems to promote ready accessibility of this collected data. For the preparation of such cross-reference cards, it has been necessary heretofore to type individual cards for each subheading. This method has not only entailed a large amount of typing effort, but also permitted the introduction of copying errors, and consequent loss or displacement of cards and expenditure of time and effort to locate or replace them.

It is an object of my invention, therefore, to provide an inexpensive and accurate means for preparing cross-reference filing cards.

A further object of my invention is to provide an inexpensive and accurate photographic means for preparing cross-reference filing cards.

A still further object of my invention is to provide a copying camera and cooperating apparatus peculiarly adapted to perform the functions of my new and improved means.

Other objects and advantages of my invention will become apparent from the specification and from the appended drawings, in which like parts are identified by like reference characters throughout.

It is to be understood that the form of this invention herewith shown and described is to be taken as a preferred example of the same and that various charges in the apparatus disclosed may be resorted to without departing from the spirit of this invention or the scope of the subjoined claims.

In its broadest aspect my new and improved means for producing cross-reference index or filing cards consist of the apparatus for preparing a plurality of double copies of an original master filing card and for trimming each of said copies so that each resulting copy contains only one full copy of the information contained upon a master filing card. This trimming operation may be performed by merely cutting the surface upon which the duplicate is printed or by masking said surface in a manner such as will be described hereinafter.

Figure 1:
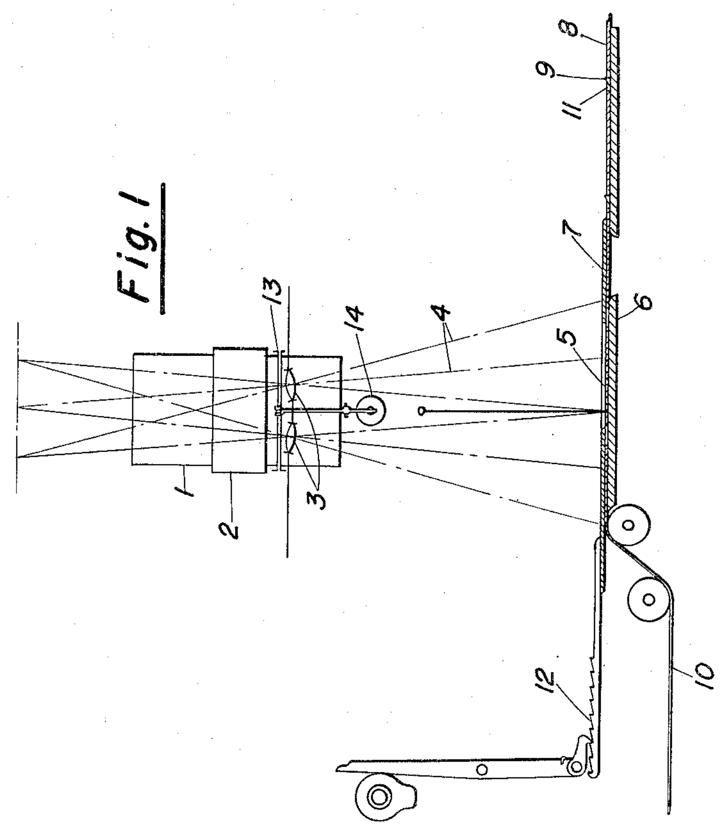
Figure 1 is a sectional elevation taken along the center line of an apparatus that may be used in constructing my improved means of photographic reproduction.
Figure 2:
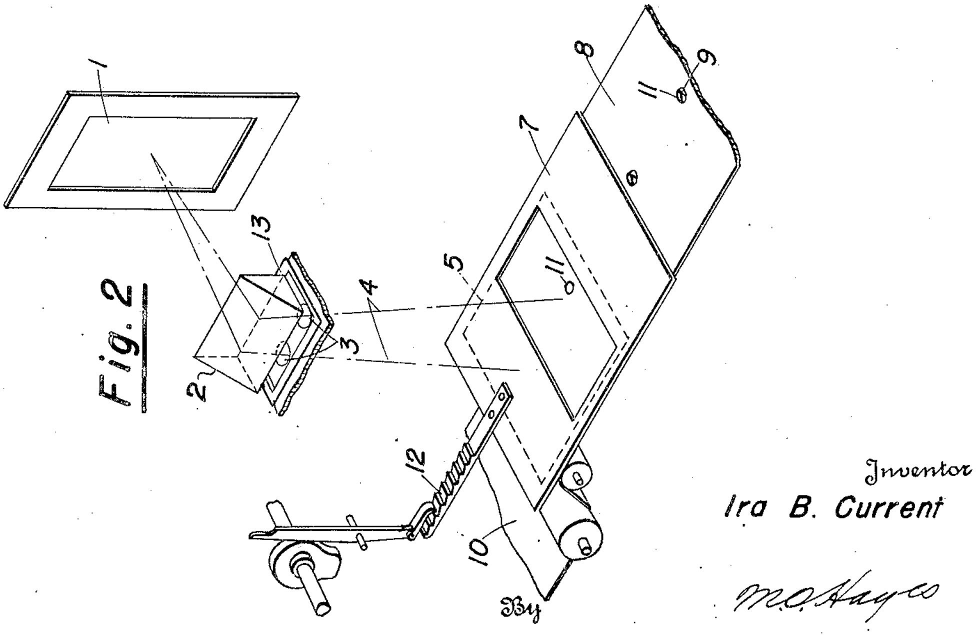
Figure 2 is a perspective view of the apparatus shown in Figure 1 with parts of the shutter mechanism broken away for clarity of illustration.
Figure 5:
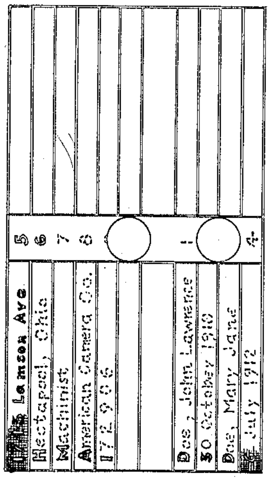
Figures 5, 6 and 7 illustrate cross-reference copies of the master card of Figure 4, produced by employment of my invention and with various subheadings in the top position.
Figure 7:
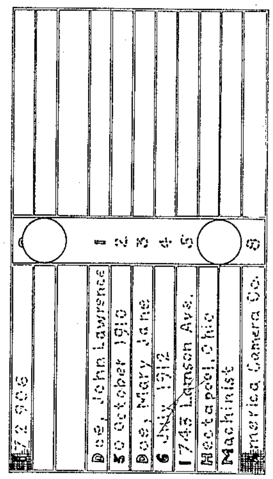
Figure 6:
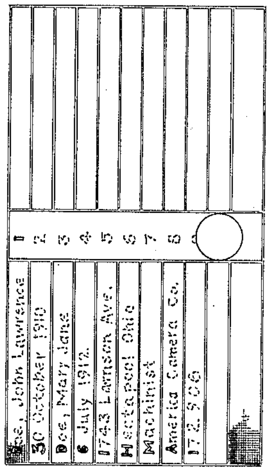

A specific example of my apparatus consists of the means described hereinafter. A master filing card is prepared and placed in an illuminated position. A lens system is employed to project two full, unreversed images of the master filing card upon sensitized paper. The sensitized paper is then developed and trimmed to the size of a full single image with a chosen subheading in the top position. Examples of results of this operation are shown in Figures 5, 6 and 7. Also, as shown in Figures 1 and 2, a masking device may be used to cover part of the projected double image, so that only one full copy of the master filing card is actually printed. The sensitized paper may be a flat sheet or a roll as shown in the drawings. A full set of cross-referenced cards may be produced by my process by printing a plurality of cards, and by varying the position of the masking device (or the places where the cards are trimmed) in each case.

Figure 8:
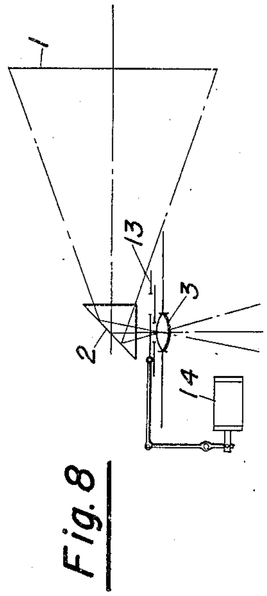
Figure 8 is a diagrammatic view of the optical system of the apparatus shown in Figure 1.
Figure 3:
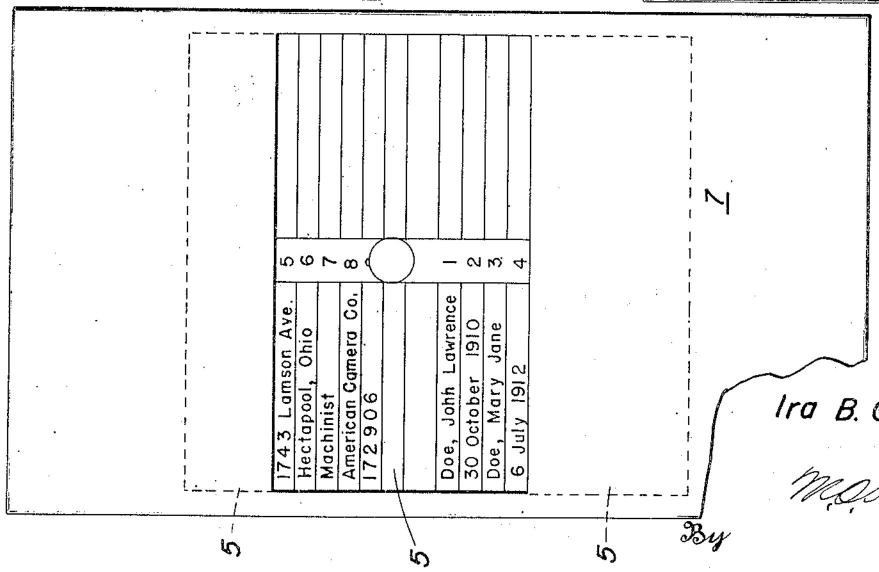
Figure 3 illustrates the manner in which the masking device of my photographic apparatus is employed to mask off predetermined areas of a projected double image, the masked off area being represented by the dotted line areas.

The drawings in this application illustrate an apparatus peculiarly adapted to perform the functions of the photographic means outlined hereinabove. In the operation of this preferred embodiment of my new card duplicating apparatus the original master filing card is placed at a position that may be properly illuminated as shown in Figures 1 and 2. The rays of light 4 from this original pass through the prism 2, which bends them 90 degrees to pass through the matched lenses 3 (in order to produce on unreversed image), which then focus two correctly orientated images 5 of the original master filing card 1 side by side and abutting one another as illustrated by Figures 2 and 3. The sensitized paper 10, in a continuous strip, passes through this focal plane, but is held stationary upon support 6 during exposure. Over the sensitized paper is an opaque mask 7, into which has been cut an aperture equal in size to one of the card images. By means of a suitable mechanical means 12, this mask is drawn forward between each exposure a distance equal to one of the line spaces of the card image. Thus after each single exposure, the mask is advanced one line space to allow an additional sub-title line to be photographed on a new area of the sensitized paper which is advanced a suitable distance by means of the pins 9 which engage holes 11 in the paper, as shown. The exposed paper 8 may be either wound on rolls for further processing or may pass directly to the processing stage which may be attached to the apparatus. When one original card has been completely photographed, and the proper number of duplicates have been made, the apparatus is automatically returned to the starting point of the phase, and a new card is inserted and photographed. The original cards may be individual cards, or they may be typed on a roll which permits automatic advancing of the originals as they have been duplicated. There is provided a suitable shutter 13 under the lenses 3 which may be mechanically operated or operated electrically by a switch 14 as shown in Figure 8. However, the shutter may be omitted if the timing is controlled by the illumination of the original.

The exposed and processed strip of card images may be cut to proper size by means of a suitable die. It may be advantageous to use a sensitized paper with a gelatine back-coating in order to minimize as much as possible the problem of curling of the cards which would interfere with their proper storage and use.

Figure 4:
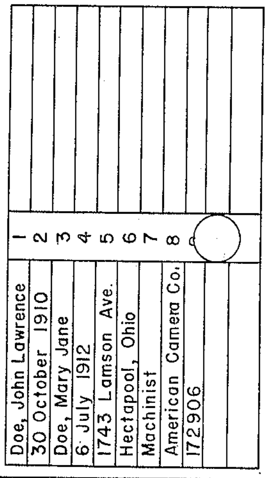
Figure 4 illustrates the typical appearance of an original master filing card.

Figure 3 illustrates the double image of the original card and the mask and apertures which selects an arrangement corresponding to one card image, the card resulting from this combination of positions is shown by Figure 5. The original card is represented by Figure 4 and straight copy thereof by Figure 6. A further illustration of a card with still another subheading is represented by Figure 7.

My invention has been specifically illustrated by a photographic method and a photographic apparatus such as shown in the drawings. However, it will be understood that any device capable of projecting and printing a double image of a card to be duplicated, in closely adjacent and parallel positions, and upon a surface suitably masked, or trimmed, when not masked so as to include only one card of equivalent area, comes within the scope of my new method for producing cross-reference filing cards. It will also be understood that other sensitive materials may be substituted for photographic paper, in the photographic embodiment of my invention. Furthermore double images of a master filing card may be "projected" by other than photographic means, such as hectograph, typewriter, etc., and "printed" upon any suitable surface, within the spirit of the broadest aspect of my invention.

Filing cards, as discussed in this application are normally prepared as shown in the drawings, with the desired information contained in a regular sequence of sub-headings arranged in vertical relation to one another. My new method and apparatus has provided an inexpensive and accurate method for preparing cross-reference filing cards, containing a complete copy of the sequence contained on a master filing card and under a selected sub-heading for cross-reference filing.

The invention described herein may be manufactured and used by or for the Government of the United States of America for governmental purposes without the payment of any royalties thereon or therefor.

What I claim is:

1. In combination, a frame member adapted to support a subject to be photographed, an element having a light-sensitive surface suitably supported in spaced relation to said frame member, optical means adapted to project two identical unreversed images of said subject on said light-sensitive surface, and an opaque masking device, said opaque masking device having a central aperture of the size of one of said images and being movably supported between said optical means and said light-sensitive surface and disposed to mask a selected portion of said images.

2. An apparatus for photographically preparing cross-reference filing cards from master filing cards which contain information in a sequence of sub-headings, said apparatus comprising a frame member adapted to support a master filing card, a light-sensitive film suitably supported in spaced relation to said frame member, optical means adapted to project two identical and adjacent images of the information on said master filing card on said light-sensitive surface, and an opaque masking device movably supported between said optical means and said light-sensitive film, said opaque masking device having a central aperture equal in width to each of said images and equal in length to the distance between identical sub-headings in each of said images, whereby said light-sensitive film is actually exposed to only predetermined and adjacent portions of each of said images to form a cross-reference filing card, said cross-reference filing card containing one complete copy of said sequence under any selected one of said sub-headings.

IRA B. CURRENT.

REFERENCES CITED

The following references are of record in the file of this patent:

UNITED STATES PATENTS

| Number | Name | Date |
|---|---|---|
| 373,404 | Hulbert | Nov. 15, 1887 |
| 1,683,468 | Jonas | Sept. 4, 1928 |
| 1,789,112 | Owens | Jan. 13, 1931 |
| 1,793,698 | Jones | Feb. 24, 1931 |
| 1,836,038 | Owens | Dec. 15, 1931 |